United States Patent
Bebout et al.

(10) Patent No.: US 11,900,311 B2
(45) Date of Patent: *Feb. 13, 2024

(54) UNIFIED VIEW OPERATOR INTERFACE SYSTEM AND METHOD

(71) Applicant: CONVEY, LLC, Austin, TX (US)

(72) Inventors: Jennifer Lynn Bebout, Austin, TX (US); Carson Bennett Krieg, Austin, TX (US); Matthew Howitt, Austin, TX (US); Clinton Frederick Miller, Austin, TX (US); Olivier Jean Marie Modica, Austin, TX (US); Sebastian Kuruvilla Karivelithara, Austin, TX (US); Christopher Richter, Leander, TX (US)

(73) Assignee: CONVEY, LLC, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/895,824

(22) Filed: Aug. 25, 2022

(65) Prior Publication Data
US 2023/0004934 A1    Jan. 5, 2023

Related U.S. Application Data

(63) Continuation of application No. 16/241,521, filed on Jan. 7, 2019, now Pat. No. 11,436,555.
(Continued)

(51) Int. Cl.
*G06Q 10/0835* (2023.01)
*G06Q 10/083* (2023.01)
*G06Q 10/0833* (2023.01)

(52) U.S. Cl.
CPC ... *G06Q 10/08355* (2013.01); *G06Q 10/0833* (2013.01); *G06Q 10/0838* (2013.01)

(58) Field of Classification Search
CPC ........ G06Q 10/08355; G06Q 10/0833; G06Q 10/0838
See application file for complete search history.

(56) References Cited

U.S. PATENT DOCUMENTS 8,504,485 B1    8/2013    Wenneman et al.
2008/0174485 A1*    7/2008    Carani ................... G06Q 10/08
342/357.46
(Continued)

OTHER PUBLICATIONS

Bodicharla, H.K.,&Cheng, E.(2014). TrackShip—Aunifiedshipment-trackingapplication.Athens:TheSteeringCommitteeofThe WorldCongressinComputerScience, ComputerEngineeringandAppliedComputing(WorldComp). (Year: 2014).*

*Primary Examiner* — Resha Desai
*Assistant Examiner* — Carter P Brockman
(74) *Attorney, Agent, or Firm* — MARSHALL, GERSTEIN & BORUN LLP

(57) ABSTRACT

A shipping management system comprises a memory configured with a set of carrier-specific mapping rules for a plurality of carriers. The system includes a non-transitory computer readable medium comprising a set of instructions executable by a processor to: apply carrier-specific mapping rules to carrier-specific records received from the respective carrier to map status codes or descriptions in the carrier-specific records from the respective carrier to generate normalized shipping information for shipments, the normalized shipping information comprising normalized status codes; store the normalized shipping information in association with the user account; receive a request for shipments associated with the user account; and generate an unified view user interface to present a unified view of shipments associated with the user account, the unified view comprising normalized statuses or descriptions for ship-
(Continued)

ments across the plurality of carriers and controls to allow a user to request additional data on individual shipments.

17 Claims, 7 Drawing Sheets

Related U.S. Application Data

(60) Provisional application No. 62/614,181, filed on Jan. 5, 2018.

(56) References Cited

U.S. PATENT DOCUMENTS

| | | | |
|---|---|---|---|
| 2010/0094674 A1 | 4/2010 | Marriner et al. | |
| 2010/0185540 A1* | 7/2010 | Hahn-Carlson | G06Q 20/10 705/40 |
| 2010/0324959 A1* | 12/2010 | Templeton | G06Q 10/08 705/14.1 |
| 2013/0283106 A1* | 10/2013 | King | G06F 40/151 714/49 |
| 2015/0278758 A1* | 10/2015 | Kim | G06Q 10/0835 705/338 |
| 2015/0324741 A1 | 11/2015 | Parry et al. | |
| 2015/0363843 A1* | 12/2015 | Loppatto | G06Q 30/0283 705/330 |
| 2018/0060829 A1* | 3/2018 | Gillen | G06Q 10/00 |

* cited by examiner

Shipper X

All Shipments

| Status In Transit ✕ | Mode ▶ | Created Date ▶ | More Filters ▶ | | Search: | | |
|---|---|---|---|---|---|---|---|

302

| Tracking # | Identifiers | Carrier | Origin | Ship Date | Status | Exception Type | Estimated Delivery |
|---|---|---|---|---|---|---|---|
| 596984318 | 110049375 BOL 3313877112 PO | Acme Freight | 75202 | 12/21/18 | In_Transit | | 1/10/19 |
| 596984433 | 110049390 BOL 6163859177 PO | Acme Freight | 75202 | 12/20/18 | In_Transit | | 12/26/18 |
| 596984400 | 110049071 BOL 524859477 PO | Acme Freight | 75202 | 12/20/18 | In_Transit | | 12/27/18 |
| 596984398 | 11005000 BOL 21118M4 PO | Acme Freight | 75202 | 12/20/18 | In_Transit | | 12/27/18 |
| 596983800 | 110049200 BOL 6163859177 PO | Acme Freight | 94105 | 12/19/18 | In_Transit | Shorted_or_ Damaged | 1/08/19 |
| 1Q120407 | | Parcel Express | 75202 | 12/19/18 | In_Transit | | 12/26/18 |
| 2843211 | 82128463 BOL | ABC Group | 75202 | 12/18/18 | In_Transit | | 01/03/19 |
| 1Q120303 | | Parcel Express | 75202 | 12/18/18 | In_Transit | | 12/10/19 |
| 2843100 | 82128163 BOL | ABC Group | 75202 | 12/18/18 | In_Transit | | 01/02/19 |
| 2843090 | 82128085 BOL | ABC Group | 75202 | 12/17/18 | In_Transit | | |

Rows Per Page 10 ▼    151-160 of 58,228    |< < 14 15 [16] 17 18 > >|

Figure 4:
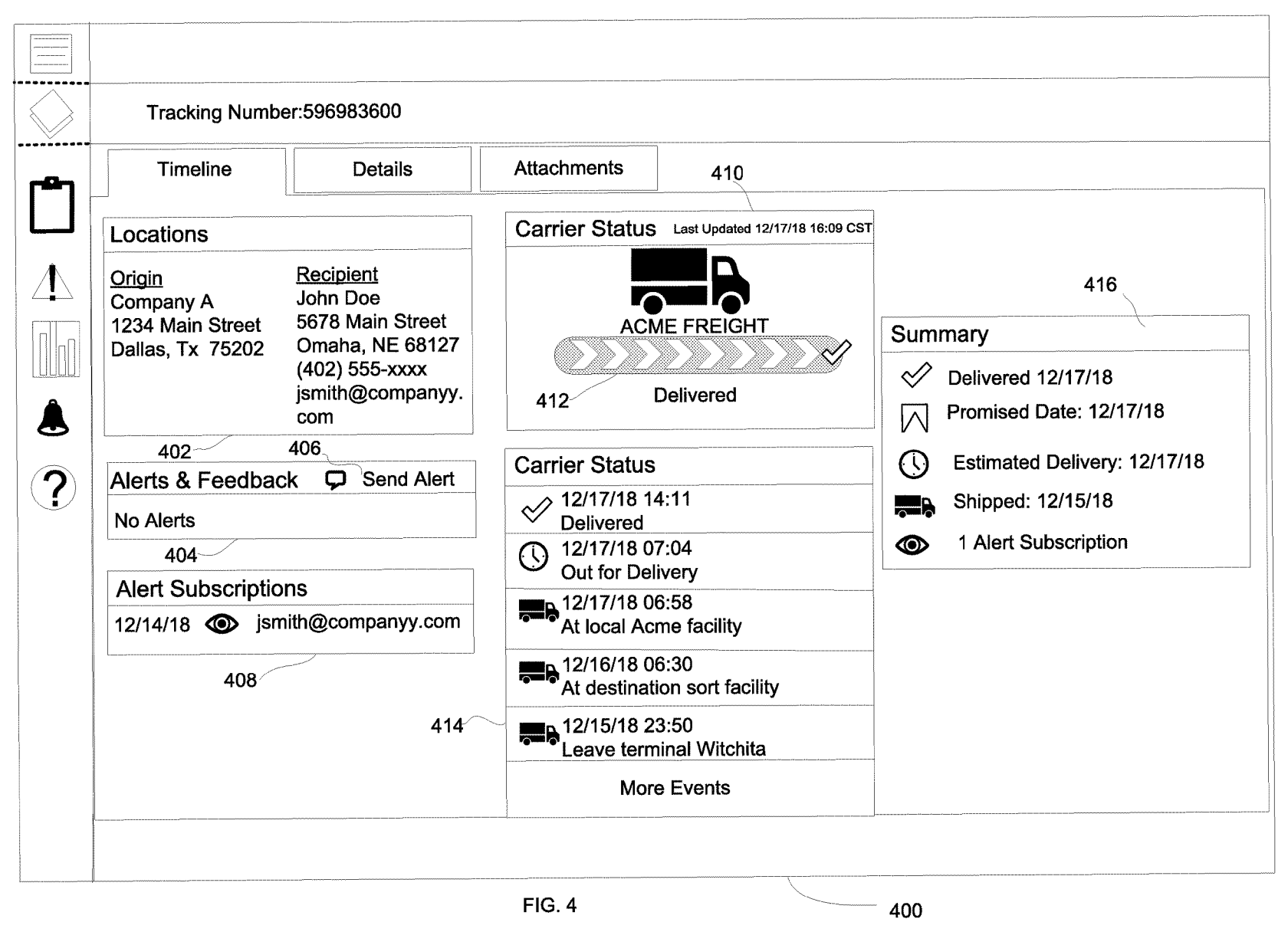

Tracking Number: 596983600

| Timeline | Details | Attachments |

Locations

Origin
Company A
1234 Main Street
Dallas, Tx 75202

Recipient
John Doe
5678 Main Street
Omaha, NE 68127
(402) 555-xxxx
jsmith@companyy.com

402

Alerts & Feedback ▭ Send Alert

No Alerts

406

Alert Subscriptions

12/14/18 ◎ jsmith@companyy.com

404

408

Carrier Status Last Updated 12/17/18 16:09 CST

ACME FREIGHT

Delivered

412

410

Carrier Status

◇ 12/17/18 14:11
  Delivered

⏱ 12/17/18 07:04
  Out for Delivery

🚚 12/17/18 06:58
  At local Acme facility

🚚 12/16/18 06:30
  At destination sort facility

🚚 12/15/18 23:50
  Leave terminal Witchita

More Events

414

Summary

◇ Delivered 12/17/18
▽ Promised Date: 12/17/18
⏱ Estimated Delivery: 12/17/18
🚚 Shipped: 12/15/18
◎ 1 Alert Subscription

UNIFIED VIEW OPERATOR INTERFACE SYSTEM AND METHOD

CROSS-REFERENCE TO RELATED APPLICATIONS

This application is a continuation application of U.S. patent application Ser. No. 16/241,521, filed Jan. 7, 2019, which claims priority to U.S. Provisional Patent Application No. 62/614,181, filed Jan. 5, 2018. These applications are fully incorporated herein by reference in their entireties.

TECHNICAL FIELD

The present disclosure relates generally to computer systems for shipping management. More particularly, the present disclosure relates to an online multi-tenant shipping management system for providing a unified view operator interface.

BACKGROUND

Many carriers provide online systems to allow shippers to schedule shipments and to provide shippers or intended recipients with in-transit tracking data that identifies when goods have passed through various designated tracking locations along the route. For smaller shippers that use multiple carriers, the shipper must independently interact with multiple carrier systems to schedule shipments and assess the status of shipments across carriers. To provide in-transit tracking data to intended recipients, such shippers may have to link to or otherwise direct intended recipients to the carrier-specific online systems.

Organizations that do a large amount of shipping may implement a shipping management system that integrates with the carrier systems to facilitate shipping and shipment tracking. However, such shipping management systems can suffer shortcomings with respect to tracking information and exception management. Shipping management systems do not typically identify exceptions across multiple carriers because there is a lack of consistency across carriers and modes as to what constitutes an exception. In addition to the lack of consistency, shippers rely on the carriers to flag exceptions, but in many cases, the carriers do not flag all actual exceptions (issues that lead to late delivery). In addition, carriers do not always update exception information in a timely manner. Accordingly, exceptions are often not exposed to shippers or intended recipients in a timely fashion that would allow the shipper or recipient to resolve the exception or take action in light of the exception.

Furthermore, prior online carrier systems and shipping management systems may provide an incomplete view of shipments to a shipper. In particular, some carriers track shipments using multiple mechanisms. Some shipments or relevant shipment related data may not be available via the carrier's online site or to a shipping management system. Moreover, to compare shipment data across carriers using prior systems, a user typically has to manually put shipment data from one carrier side-by-side with shipment data from the other carrier and use industry and data knowledge provided by the person to subjectively summarize the meaning of the carrier-specific shipment data. Only once a person with industry and data knowledge has manually reviewed each element of the shipment data can the full context of a shipment be meaningfully understood. This process has to be repeated for each carrier and shipment in a non-systematic way, which removes any ability to compare data across carriers with meaningful context.

Prior systems also suffered limitations when integrated in the broader context of an enterprise system. Some organizations, for example, integrate shipping management data into business process management ("BPM") systems—BPM systems are computer systems that automate business processes through software defined business processes and rules. With prior systems, it is not possible to express a single BPM rule, or metric, across an entire network of carriers because a BPM rule using shipment data from one carrier cannot typically be executed against shipment data from another carrier. Consequently, duplicative rules would have to written and stored for each carrier-specific data format.

SUMMARY

One embodiment is directed to a shipping management system that comprises a memory configured with a set of carrier-specific mapping rules for a plurality of carriers, each mapping rule comprising an input status code or a status description in a carrier-specific format, a matching rule, and a resulting normalized status code. The memory is further configured with carrier credential information associated with a user account. The system further includes a processor coupled to the memory. The system further comprises a non-transitory computer readable medium comprising a set of computer executable instructions, the computer executable instructions executable by the processor to: connect to carrier systems of each of the plurality of carriers, provide respective carrier credentials from the user account to each carrier system, receive, from each carrier system, carrier-specific shipment records based on the provided respective carrier credentials, apply respective carrier-specific mapping rules from the set of carrier-specific mapping rules to the carrier-specific records received from the respective carrier to map status codes or descriptions in the carrier-specific records from the respective carrier to generate normalized shipping information for shipments across the carriers, the normalized shipping information comprising normalized status codes, store the normalized shipping information in association with the user account, receive, via a user interface, a request for shipments associated with the user account; and generate an unified view user interface to present a unified view of shipments associated with the user account, the unified view comprising normalized statuses or descriptions for shipments across the plurality of carriers and controls to allow a user to request additional data on individual shipments.

Another embodiment includes a computer program product comprising a non-transitory computer readable medium storing a set of computer executable instructions. The set of computer executable instructions comprising instructions executable by a processor to access a memory configured with a set of carrier-specific mapping rules for a plurality of carriers, each mapping rule comprising an input status code or a status description in a carrier-specific format, a matching rule and a resulting normalized status code, and carrier credential information associated with a user account. The set of computer executable instructions further comprise instructions executable to connect to carrier systems of each of the plurality of carriers, provide respective carrier credentials from the user account to each carrier system, receive, from each carrier system, carrier-specific shipment records based on the provided respective carrier credentials, apply respective carrier-specific mapping rules from the set of carrier-specific mapping rules to the carrier-specific records received from the respective carrier to map status codes or descriptions in the carrier-specific records from the respective carrier to generate normalized shipping information for shipments across the carriers, the normalized shipping information comprising normalized status codes, store the normalized shipping information in association with the user account, receive, via a user interface, a request for shipments associated with the user account and generate an unified view user interface to present a unified view of shipments associated with the user account, the unified view comprising normalized statuses or descriptions for shipments across the plurality of carriers and controls to allow a user to request additional data on individual shipments.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions, or rearrangements may be made within the scope of the disclosure without departing from the spirit thereof, and the disclosure includes all such substitutions, modifications, additions, or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein:

FIG. 3 is a diagrammatic representation of one embodiment of an operator interface providing a unified view;

FIG. 4 is a diagrammatic representation of one embodiment of an operator interface providing additional detail;

DETAILED DESCRIPTION

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Figure 1:
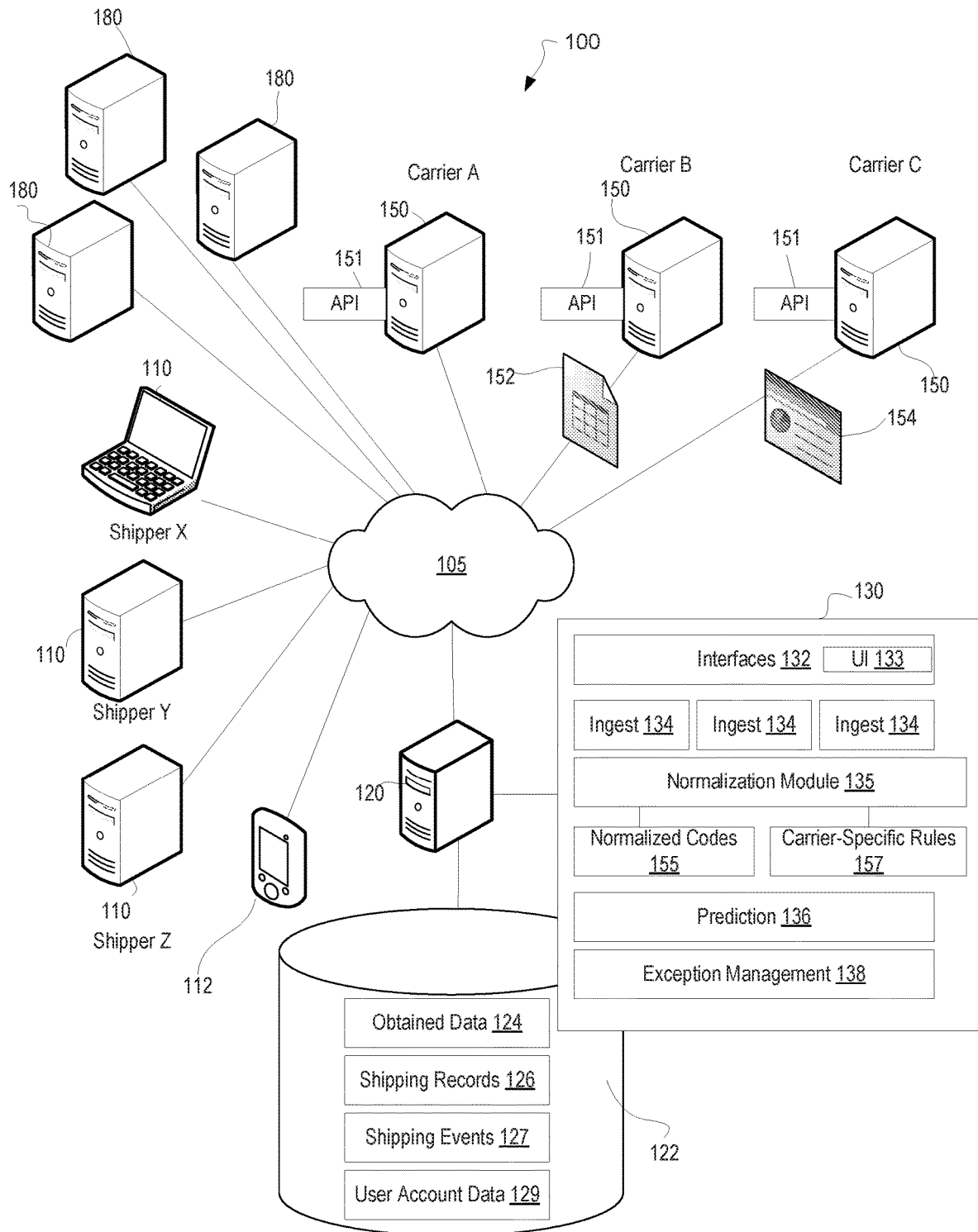
FIG. 1 is a diagrammatic representation of one embodiment of a topology that includes a shipping management system.

Embodiments of the systems and methods of the present invention may be better explained with reference to FIG. 1, which depicts one embodiment of a topology 100, which may be used to implement certain embodiments. Topology 100 comprises a data processing system 120 (referred to as shipping management system 120) bi-directionally coupled to shipper computing systems 110, recipient computer systems 112 and carrier computer systems ("carrier systems") 150 through network 105. Shipping management system 120 may also connect to various other external systems 180, such as e-commerce servers, ERP systems, TMS systems, ESP/SMS systems, CSR/CRM systems. According to one embodiment, shipping management system 120 may provide a cloud-based system or other network accessible system that multiple shippers can use to manage and track shipments across multiple carriers. Network 105 may be for example, a wireless or wireline communication network such as the Internet or wide area network (WAN), publicly switched telephone network (PTSN) or any other type of electronic communication link.

Shipping management system 120 may comprise one or more computer systems with central processing units executing instructions embodied on one or more computer readable media where the instructions are configured to perform at least some of the functionality associated with embodiments of the present invention. These applications may include a shipping management application 130 comprising one or more applications (instructions embodied on a computer readable media) configured to implement interfaces 132, data ingest modules 134, a normalization module 135, prediction module 136 and an exception management module 138 utilized by the shipping management system 120.

Furthermore, shipping management system 120 may include data store 122 operable to store obtained data 124 collected from carrier systems 150, shipping records 126, shipping event records 127, user account data 129 and other data. User account data 129 can include account information for holders of accounts with shipping management system 120 (e.g., profile data for account holders). The account holder may an individual, shipper or an entity, such as a retailer, that uses drop shippers, where the drop shippers may or may not be account holders.

The user account data 129 may include carrier credentials where the carrier credentials include information necessary to retrieve shipment data for the account holder from one or more carrier systems 150. The carrier credentials for an account holder/carrier pair (e.g., a shipper/carrier pair) may include a customer number, username and password, secret key, token or other information so that management system 120 may request shipment data. For example, the account information for Shipper X may include information to log in and request shipment data for Shipper X from Carrier A's system 150, information to log in and request shipment data for Shipper X from Carrier B's system 150, and information to log in and request shipment data for Shipper X from Carrier C's system 150. The carrier credentials may also include information so that shipping management system 120 can log into a carrier system 150 on behalf of the account holders to schedule a pick up or perform other operations. The carrier credential information may be provided as part of onboarding a shipper or other account holder.

Shipping management system 120 utilizes interfaces 132 configured to, for example, receive and respond to queries from users at shipper computer systems 110 or recipient computer systems 112, interface with carrier computer systems 150, and interface with other external systems 180, obtain data from or provide data obtained, or determined, by shipping management system 120 to any of shipper computer systems 110, recipient computer systems 112, carrier computer systems 150 and other external system 180. It will be understood that the particular interface 132 utilized in a given context may depend on the functionality being implemented by shipping management system 120, the type of network 105 utilized to communicate with any particular entity, the type of data to be obtained or presented, the time interval at which data is obtained from the entities, the types of systems utilized at the various entities, etc. In some embodiments, these interfaces may include, for example web pages, web services or application programming interfaces (APIs). In particular, in some embodiments, shipping management system 120 can provide an API so that online ordering systems may be integrated with shipping management system 120. Shipping management system 120 may select a carrier and schedule pick up of a shipment as part of a customer checkout process on an online ordering system.

According to one embodiment, shipping management system 120 may provide a user interface (UI) 133 to provide shippers with unified views of shipment data related to the shippers. The UI 133 may comprise web pages, mobile application pages or other pages or data to provide a unified view.

According to one embodiment, shipping management system 120 may provide an interface 132 through which a user can define a shipment. An ingest module 134 may be configured to receive and process order-level information from shippers in the form of data files exchange or Web Service API integration and relevant shipment data. The shipment data may include an account holder if different than the shipper (e.g., a drop shipper can indicate (or it may be implicit) that the shipment is on behalf of a particular retailer), recipient, from address (shipper), to address (consignee), weight, product class and dimensions and other information. Shipping management system 120 may provide carrier selections to the user so that the user may select a final shipper or shipping management system 120 may automatically select the carrier. According to one embodiment, shipping management system 120 may apply rules to a combination of signals (e.g., transportation signals, historical signals, business signals) to determine the carriers from which a user may select or to automatically select a carrier as described in U.S. patent application Ser. No. 15/836,374, filed Dec. 8, 2017, entitled "SHIPPING MANAGEMENT SYSTEM WITH MULTI-CARRIER SUPPORT", which is hereby fully incorporated by reference for all purposes.

Shipping management system 120 may then interact with the carrier system 150 for the selected carrier to execute the shipment. In some cases, a carrier systems 150 may provide public APIs 151 that allow external systems to execute shipments and access tracking data and shipping management system 120 may use the API to execute the shipment.

In other cases, a shipper can initiate a shipment directly with a carrier and provide the shipment data to the carrier without going through shipping management system 120. The shipper can provide a tracking number or other shipment identifier to shipping management system 120 and other shipment information (e.g., whether an intended recipient should receive notifications and the contact information for the intended recipient) via interface 133 so that shipping management system 120 can request the appropriate shipment information from the carrier system 150. In other embodiments, shipping management system 120 can discover shipments associated with an account holder from information provided by a carrier system 150 and obtain shipment information from the carrier system 150.

During shipment, carrier systems 150 provide shipment tracking data that indicates the status shipments (e.g., when a shipment was ready for pickup, when the shipment was picked up, check in/check out at various tracking locations, when the shipment was actually delivered and other information). Each tracking update can contain one or more of status (status code or other description), location and time information for a shipment. In some cases, a tracking update may indicate an exception (event that delays or otherwise adversely affect a shipment). Exception data may include for example, data that indicates that a pickup was missed, a shipment was delivered late, a shipment was damaged, etc.

Carrier systems 150 may provide shipment-specific data, including shipment tracking data through a variety of mechanisms. Data sources for shipment specific data include, but are not limited to, shipment record files (e.g., spreadsheets, comma-separated files, other structured files, etc.), public APIs provided the carriers, data scraped from web sites, data manually received from carriers, data pushed from a carrier, etc. For a given carrier, data may be acquired in multiple ways and integrated together to provide a combined view of the data compared to getting data from a single source.

When integrating shipping management system 120 with a carrier system 150, a "discovery process" occur to make a determination of what combination of data sources will give the best overall information. This discovery process could take the form of research, manually consulting with the carrier, etc. Ingest modules 134 can then be configured to gather shipment specific data from that carrier. For a given carrier, data may be acquired from multiple sources and integrated together.

Some carrier systems 150 implement a document interchange mechanism that allows users to register to receive shipment report files 152 formatted according to a defined specification. According to one embodiment, the document interchange may be performed using a standardized electronic data interchange (EDI) format or proprietary format. In another embodiment, the document interchange may involve a carrier system 150 sending shipment report files 152 as email attachments to an email address accessible by shipping management system 120 or uploading to an FTP site or other network location accessible by shipping management system 120.

The shipment report files 152 provided by a carrier system 150 can be formatted according a specification known to both the carrier and the implementer of shipping management system 120. For example, the shipping report files 152 may be a comma-separated value file or spreadsheet in which the columns adhere to a defined specification. An ingest module 134 may be configured to request, receive and or access shipment report files from a carrier and process the shipment report files according to the defined format to extract shipment data.

Shipment report files have a variety of degrees of information, depending on the carrier. For some carriers, the shipment report files merely indicate the existence of shipments (e.g., simply provide a list of shipment numbers for shipper). In other cases, the shipment report files include additional shipment information including, in some cases, shipment status information.

Some carrier systems 150 provide public APIs 151 that allow external systems to access tracking data. For systems with an API, an ingest module 134 may be programmed to make calls to the API 151 to collect tracking data related to shipments by that carrier. As a more particular example, an ingest module 134 can be configured to integrate with a Web Service API using a service client to perform a request with shipment data, such as a tracking number or reference number, to the web service and process the response from the service.

Some carriers provide shipment-specific information using both shipment report files and API-based shipment data such that the information from periodic shipment report files can be augmented using tracking updates collected via the API 151. A carrier system 150, for example, may be configured to provide periodic shipment report files (e.g., every few minutes, every several hours or other period) on a per-shipper basis and provide additional shipment-specific information via an API 151. For example, Carrier A's system 150 may periodically provide a shipment report file for Shipper X, a shipment report file for Shipper Y and a shipment report file for Shipper Z and also provide shipment status updates via the respective API 151.

Shipping management system 120 may thus include an ingest module 134 configured to receive shipping report files from a carrier system 150 and an ingest module 134 configured to poll the carrier system's API 151 for updates. For example, shipping management system 120 may include a first ingest module 134 configured to process shipping report files from Carrier A to extract shipments associated with a shipper and a second ingest module 134 to poll the API 151 provided by Carrier A to update shipment status information.

Other carrier systems 150 may provide tracking data through a web page interface, such as web page 154. However, since the structure of a web page can be understood through observation, an ingest module 134 may be programmed to provide shipment information to a web site, download the HTML content from the carrier tracking web page and extract the relevant tracking information using rules to identify the tracking data on the page. Ingest modules 134 may also be programmed to collect tracking data through other mechanisms.

It can be noted that shipping management system 120 may receive, via interaction with carrier systems 150, shipment data on shipments regardless of whether the shipments were executed through shipping management system 120. Thus, shipping management system 120 can discover shipments not initiated through shipping management system 120 and unify shipment-specific data for shipments initiated through various channels and across carriers.

Ingest modules 134 may use a set of scheduling rules to schedule how often tracking data is requested from the different sources, unless the update frequency is controlled by the carrier as may be the case when receiving shipment reports via email attachments. The scheduling rules can take into consideration the current status of the shipment, the type of shipment, the expected delivery date, the carrier and whether a person or system is subscribed for updates (e.g., SMS text notifications of updates).

In one embodiment, the scheduling rules are hard-coded. In another embodiment, the scheduling rules are user configurable and shipping management system 120 can provide an interface to allow a user with appropriate privileges to compose or edit scheduling rules.

Some examples of scheduling rules include, but are not limited to:
1) If the shipment is scheduled but not yet in transit then
   i) update once a day if the shipment is 2 or more days away from shipping; ii) else update once per 6 hours;
2) If the shipment is in transit then update once per hour;
3) If the shipment is out for delivery then update once per 15 minutes;
4) If the shipment is delivered then do not update.

Thus, in some embodiments, shipping management system 120 collects information about a shipment based on the last known status of the shipment.

The collected data may include, among other information, both temporal ("when") and location ("where") information that is used to build a full context of each tracking update. Each tracking update can contain one or more of status (status code or description), exception, location and time information for a shipment. The exception information will either be extracted as-is (if the carrier provides such information) or will be computed through status mapping using carrier-specific rules. In some embodiments, the system can intelligently fill in gaps in the collected information by leveraging known information about the shipment, such as origin and destination information. For example, if the location information for a "delivered" tracking update is not available, the shipment destination information can be used to fill in that information.

When processing shipment-specific information for a shipper, shipping management system can identify if the shipment is a new shipment (a shipment for which there is no shipping record 126) or an existing shipment. If the shipment is a new a shipment, shipping management system 130 can create a shipping record 126. In general, shipments can be identified as new or existing shipments because carriers assign each shipment a unique shipment or tracking number. On example of a set of shipping records is illustrated in Table 3, below.

Normalization module 135 is configured to map between the carrier specific formats used by each carrier system 150 and normalized data. In accordance with one embodiment, normalization module 135 includes normalization rules (e.g., carrier-specific status mappings 157) to map the carrier tracking codes in the received carrier data to (internal) normalized tracking codes 155, examples of which are discussed below.

According to one embodiment, normalization module 135 processes carrier-specific status mappings 157 that map specific status code values or status description values or both to one of a number normalized statuses along with an exception category when appropriate. In general, the statuses correspond to various stages of a shipment (e.g., pickup scheduled, picked up, in-transit, available for pick up, out for delivery, delivered).

In one embodiment, shipping management system 120 defines a status mapping document (e.g., in JavaScript Object Notation (JSON) format or other format) which defines:
  An input status code and/or status description.
  A matching rule, which is either "matches exactly", "starts with", "ends with" or regular-expression based, that is applied to the input status code or status description. In some embodiments, applying matching rules may include parsing carrier provided transit data for specific codes or descriptive words (e.g., "arrived").
  A resulting normalized status code and exception type for each matching input.

By defining a carrier-specific status mapping, shipping management system 120 can compensate for differences between carriers using more or less specific rules based on the granularity for the source data.

In the example where shipping management system 120 defines a status mapping document in JSON format, the JSON document can be used to define rules per carrier and per status code and/or status description. The general structure of an exemplary JSON document is as follows:
1. Carrier
   1.1 Status code
      If status pattern matches then set status and exception type, if appropriate.
      Status pattern is match exactly, starts-with, ends-with or regular-expression match.
   1.2 Status description
      If status description pattern matches then set status and exception type, if appropriate.
      Status pattern is match exactly, starts-with or ends-with.

Essentially, the JSON document provides a tree of decisions, starting with determining the carrier, since the rules are carrier-based. Next, a matching rule determines if the status pattern matches a status code value. In some examples, the status pattern could match a status code exactly. In other examples, the status pattern does not match exactly, but the status pattern "starts with", "ends with", etc. a value. If the rules do not match a status code, the system can map a fallback value, such as "in transit". Other examples are also possible.

Following is an example of a rules JSON document that can be used to define rules per carrier and per status code and/or status description:

```
"CARRIER_A": {
  "STATUS_VALUE": {
    "type": "SINGLE",
    "state": {
      "status": "IN_TRANSIT",
      "exception_type": "ATTEMPTED_DELIVERY"
    }
  }
}
```

As described above, normalization module 135 is configured to map between the carrier specific formats used by each carrier system and internal normalized tracking codes 155. Examples of normalized status codes include, but are not limited to: "SCHEDULED", "IN_TRANSIT", "APPOINTMENT", "OUT_FOR_DELIVERY", "DELIVERED", "CANCELED". Table 1 provides an example of normalized codes to which the normalization module 135 maps. The example shown in Table 1 shows shipping status information from multiple carriers (Carrier A, Carrier B, Carrier C) being mapped to normalized shipping status codes. As shown, Column 1 of Table 1 identifies the carrier for each shipment. Column 2 of Table 1 shows shipping status code provided by the respective carrier. As described above, shipping status codes from different carriers are not standardized. Column 3 of Table 1 shows the normalized shipping status.

TABLE 1

| CARRIER | CARRIER STATUS CODE | NORMALIZED STATUS |
| --- | --- | --- |
| CARRIER A | AWDEL | IN_TRANSIT |
| CARRIER A | PDEL | DELIVERED |
| CARRIER B | ON-HAND AT DESTINATION | IN_TRANSIT |
| CARRIER B | DELIVERED | DELIVERED |
| CARRIER C | SE | IN_TRANSIT |
| CARRIER C | OD | OUT_FOR_DELIVERY |

As shown in Table 1, each carrier uses internal codes to indicate the status of a shipment. Since different carriers use different codes for similar status information, it is difficult for end users to analyze and compare shipment information across multiple carriers. However, once the status codes are mapped and normalized by the normalization module (column 3 of Table 1) a user can easily analyze and compare shipment information across multiple carriers. For example, as shown in Table 1, rows 2 and 4 show a status of "DELIVERED" by Carrier A and Carrier B, despite each carrier using different internal status codes (e.g., see Column 2, "PDEL" and "DELIVERED").

The normalization module can also map carrier specific exceptions to normalized exception codes. Some carriers indicate exceptions using status codes for the exceptions while others indicate an exception through a flag or a description associated with another status code. In any case, the carrier-specific exceptions can be mapped to normalized exceptions. Table 2 is an example of a set of exceptions to which carrier-specific exceptions may be mapped:

TABLE 2

| Exception Type | Description |
| --- | --- |
| attempted_delivery | Attempted delivery. |
| available_for_pickup | Available for pickup by recipient at carrier terminal or access location. |
| consignee_refused | Consignee refused shipment. |
| customer_change_request | Customer change requested. May include a future delivery, hold or service level change. |
| damaged_or_shorted | Shipment damaged. |
| general_delay | General delay. |
| held_at_terminal | Shipment held at terminal waiting for additional delivery instructions. |
| incorrect_address | Incorrect address or contact information. |
| no_attempt_made_scheduled_next_day | Scheduled for next day. |
| reconsigned | A change was made to the recipient's delivery address. |
| remote_address | An area that is difficult to access, therefore the carrier may deliver there less frequently. |

TABLE 2-continued

| Exception Type | Description |
| --- | --- |
| return_to_sender | Shipment returned to sender. |
| schedule_appointment | Cannot schedule delivery. |
| shipment_correction | Shipment correction. Weight, dimensions and classifications are typical rating attributes corrected that result in higher or lower shipping costs. |
| shipment_label_replaced | Shipping label replaced. |
| tendered_late | Tendered late. |
| unable_to_track | Carrier unable to track shipment. |
| weather_delay | Weather delay. |

Table 3 is an example showing exception information from multiple carriers (Carrier A, Carrier B, Carrier C) being mapped to normalized exception codes. As shown, Column 1 of Table 3 identifies the carrier for each transaction. Column 2 of Table 3 shows an exception status code or description provided by the carrier. As described above, status codes from different shippers are not standardized. Column 3 of Table 3 shows a sample of the normalized exception status.

TABLE 3

| CARRIER | STATUS CODE | EXCEPTION |
| --- | --- | --- |
| Carrier A | Your shipment has been delayed. Please contact the destination service center | held_at_terminal |
| Carrier B | PODP | damaged_or_shorted |
| Carrier C | Refused | consignee_refused |

Table 4 illustrates and example embodiment of shipping records 126, including some normalized data. In the example shown, each shipment has an internal shipment id (Column 1) that the shipping management system 120 uses to identify each shipment. Column 2 of Table 4 shows the normalized status of each respective shipment. Column 3 of Table 4 identifies the carrier for each respective record. Each shipment includes a tracking number (Column 4 of Table 4), provided by the carrier. If the shipment has an exception, the normalized exception type is identified in Column 5 of Table 4. In general, the most recent exception for a shipment may be stored in the shipping record for the shipment. Finally, Columns 6 and 7 of Table 4 show the origin and destination of each shipment.

A shipping record may also include other information provided by the carrier or shipper for shipments including, for example estimated delivery dates, purchase order (PO) numbers, bill-of-lading (BOL) numbers or other information. In one embodiment, the shipper may provide to the shipping management system data that includes the PO numbers for shipments. In other cases, the shipper may push this information to the carrier and the shipping management system can receive it from the respective carrier system (e.g., in a shipment record file or in response to an API call). A shipping record may also include a recipient notification field to indicate whether the recipient has subscribed for updates.

Further, shipping records can be associated with specific account holders (e.g., shippers or other entities) of the shipping management system 120. For example, data store 122 may store account holder records for each account holder that indicate the shipments associated with that account holder. In another embodiment, a shipping record may indicate the account holder with which it is associated. Thus, a particular user will only be able to access the shipping records associated with the account holder for which the user has access.

Table 5 is a table showing shipment events for a particular shipment (SHIPMENT_ID 1000), including some normalized data. In the example shown, each shipment event has an internal id (Column 1 of Table 5). Column 2 of Table 5 shows the shipment id, which identifies the shipment. Column 3 of Table 5 shows the normalized status value. Column 4 of Table 5 shows the normalized exception value, if the shipment event has an exception (for example, event 1002 shows exception "HELD_AT_TERMINAL"). Finally, Col-

TABLE 4

| ID | STATUS | CARRIER NAME | TRACKING NUMBER | EXCEPTION TYPE | ORIGIN | DESTINATION |
| --- | --- | --- | --- | --- | --- | --- |
| 1000 | IN_TRANSIT | Acme Freight | 596984318 | NULL | Dallas, TX | Austin, TX |
| 1001 | IN_TRANSIT | Parcel Express | 1Q120303 | DAMAGED_OR_SHORTED | San Francisco, CA | Los Angeles, CA |

A shipping record will typically include more information than is shown in Table 4, which, for clarity, shows just a few exemplary fields. A shipping record may include, for example, the recipient name, address and other information.

umn 5 of Table 5 shows the time and date that the event was created. The time and date values can be used to determine the order in which the events occurred, since they may not all be received in order.

TABLE 5

| ID | SHIPMENT_ID | STATUS | EXCEPTION_TYPE | CREATED_DATETIME |
|---|---|---|---|---|
| 1001 | 1000 | SCHEDULED | NULL | 2018-12-20T01:13 |
| 1002 | 1000 | IN_TRANSIT | HELD_AT_TERMINAL | 2018-12-21T13:05 |
| 1003 | 1000 | IN_TRANSIT | NULL | 2018-12-23T06:40 |

The shipment event records of Table 5 are provided by way of example and shipment event records can store additional or alternative data. For example, a shipment event record may specify a location associated with an event.

In addition to normalized exception flags determined from the carrier specific exception codes, shipping management system may generate predicted exceptions. More particularly, prediction module 136 may be programmed with rules to identify potential exceptions (also referred to as a "predicted exceptions" herein). Examples of predicted exceptions include, but are not limited to, the predicted exceptions illustrated in Table 6.

TABLE 6

| Predicted Exception | Description |
|---|---|
| convey_missed_estimated_delivery_date | Carrier missed carrier's original estimated delivery date. |
| convey_missed_pickup | Carrier missed pickup warning. |
| convey_predicted_delay | Delay warning. |

Figure 2:
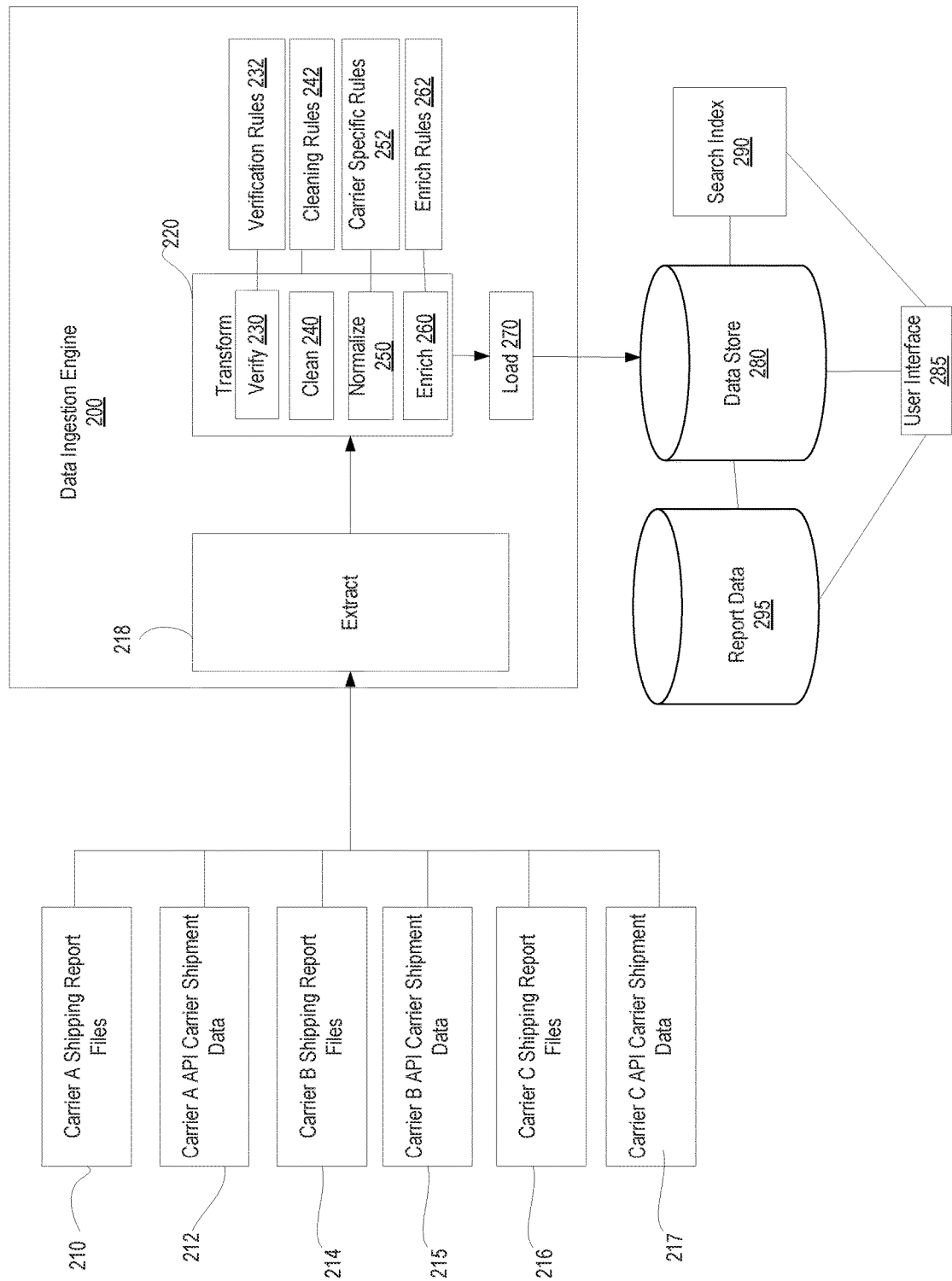
FIG. 2 is a diagrammatic representation of one embodiment of an ingestion engine.

If a predicted exception is determined for SHIPMENT_ID:1000 of FIG. 2, the predicted exception can be added as an event to the shipment events for SHIPMENT_ID:1000 in Table 4. The shipping record for SHIPMENT_ID:1000 may also be updated to reflect the predicted exception as the most recent exception.

For example, a rule may specify that if a shipment is marked as "pickup scheduled", but no action has occurred on a shipment for "x" number of hours, the shipment can be flagged as having a potential exception (also referred to as a "predicted exception" herein). For example a rule can specify that if a shipment is scheduled but is not in transit within 12 hours of the ship date, then a missed pickup exception can be set (e.g., an event with "convey_missed_pickup" from Table 1 can be added to the event records for the shipment and the shipping record updated). In another example, if a shipment is not delivered and the estimated delivery date has passed then, then a missed estimated delivery date can be set (e.g., "convey_missed_estimated_delivery_date" from Table 6). According to one embodiment, predictive exceptions may be determined as described in U.S. patent application Ser. No. 15/836,354 filed Dec. 8, 2017, entitled "SYSTEMS AND METHODS FOR PREDICTIVE IN-TRANSIT SHIPMENT DELIVERY EXCEPTION NOTIFICATION AND AUTOMATED RESOLUTION" which is hereby fully incorporated by reference herein for all purposes.

Exception management module 138 is configured with rules for classifying exceptions and taking actions based on exceptions. One example embodiment of an exception management module 138 is described in U.S. patent application Ser. No. 15/836,354, incorporated by reference above.

A user at a shipper computer system 110 may access the shipping management system 120 through the provided interfaces 132 using account holder credentials and specify certain parameters, such as a carrier, mode, shipment status information, a tracking number and other information. Shipping management system 120 can generate user interfaces using data determined from the processing and present these interfaces to the user at the user's computing device 110. More specifically, in one embodiment interfaces 132 may visually present shipment information, including predicted exceptions to the user.

As described above, data can be acquired from carriers from one or more sources. The shipping management system 120 can become aware of shipments from several sources. If a user uses the shipping management system to schedule a shipment, then the shipping management system will be aware of the shipment and can create a shipping record and corresponding initial event record when the shipment is executed by the shipping management system. In another example, a carrier will make the shipping management system 120 aware of an account holder's shipments via shipment report files, notifications, responses to requests, or other mechanism. In another example, users will make the shipping management system aware of shipments by entering, through a user dashboard, tracking numbers or other information corresponding to shipments executed through carrier systems 150.

If the shipping management system is configured to become aware of a shipment from multiple sources (via notifications from a carrier and from a user, for example) the system can determine that the information relates to an existing shipping record (for example, due to the use of a unique reference number and destination postal code), and will integrate the information, rather than create separate records for the same shipment.

Embodiments described herein can implemented in a variety of manners. According to one embodiment, for example, normalization module 135 may be implemented in an ingestion engine. FIG. 2 is a functional block diagram of one example of a data ingestion engine. It can be noted that shipping management system may request shipment information on behalf of an account holder (e.g., shipper), using the credentials for that account holder to retrieve information from a carrier system. Thus, shipping management system may receive information on shipments for that account holder regardless of whether the shipments were executed through the shipping management system. The data ingestion engine 200 may also receive shipment information from other sources, as described above.

FIG. 2 shows data ingestion engine 200 that receives shipment information from a plurality of carriers according to a plurality of integration paths. In particular, the shipping management system is configured to receive shipping report files for account holders and to query respective APIs for additional shipment data. Thus, ingestion engine 200 may receive Carrier A shipping report files 210, Carrier B shipping report files 214 and Carrier C shipping report files 216 and Carrier A API shipment data 212, Carrier B API shipment data 215, Carrier C API shipment data 217.

At extract step 218, ingestion engine 200 extracts carrier shipment records from received shipping record files or API shipment data. According to one embodiment, each shipping report file 210, 214, 216 provided by a carrier contains shipment information for a particular shipper (or other account holder) and is formatted according to a defined format, which may be carrier specific. Ingestion engine 200 can be configured to extract carrier shipment records for a shipper from the shipping report files. In some cases, the carrier shipment record from a shipping report file is simply unique shipment identifier (such as a tracking number or other unique, carrier-assigned shipment identifier) to indicate the existence of a particular shipment. In other cases, a shipment record may include status information.

Further, data 212, 215, 217 returned based on API calls may include shipment information formatted according to the respective public API 151. Ingestion engine 200 can be configured to extract carrier shipment records from the data returned via the APIs. In some embodiments, ingestion engine 200 may be configured to extract shipment identifiers from shipping report files and make API calls to collect additional information about the identified shipments.

Ingestion engine 200 may further implement a transform step 220, that may include several processes. For example, in the illustrated embodiment, transform step 220 includes processes to verify 230, clean 240, normalize 250 and enrich 260. At the verify 230 step, ingestion engine 200 applies verification rules 232 to verify the accuracy or validity of the data. The verification rules may depend on carrier, shipper or other parameters. For example, for a particular shipper, the verification rules may specify that an order number has to have a known number of characters, or start or end with a known sequence of characters. If the data does not match the expected data pattern, ingestion engine 200 can make a determination of whether to discard or ignore the data. Such rules may be specific to certain carriers and/or certain account holders (e.g., shippers). If the verification step identifies an issue, ingestion engine 200 may also attempt to correct errors, or search for data from another data source.

At clean 240 step, ingestion engine 200 applies data cleaning rules 242 to clean the input data carrier shipment records or to make data fields consistent. Examples of cleaning steps may include deleting leading or trailing spaces in a data field, standardizing zip code or state field formats.

At normalize step 250, ingestion engine accesses carrier-specific rules 252, which may be an example of rules 157, to map carrier-specific status codes, descriptions and exception flags to normalized status codes, descriptions and exception flags. As described above, data from a plurality of carriers or data sources is normalized, resulting in data that has common status codes across multiple carriers and other data sources. Another aspect of data normalization relates to information received that is not in the form of a status code. For example, some carriers may generate status or tracking information in the form of messages that may not be even internally standardized, for example, in the form of free-form text, text chosen from a list, etc. Ingest engine 200 can be configured to analyze free-form text or similar messages and attempt to determine a normalized status. In one example, ingest engine 200 uses word matching algorithms to match words in a message with key words that may indicate a particular status. In another example, machine learning or trained computers can be used to analyze and interpret the text in messages.

For a carrier shipment record associated with a shipper (or other account holder), ingestion engine 200 can traverse a rules document to determine the rules applicable to the carrier. In applying a rule, ingestion engine 200 determines if an input status code and/or status description matches a condition based on the specified matching rule (e.g., "matches exactly", "starts with", "ends with" or regular-expression based matching rule, that is applied to the input status code or status description). In some embodiments, applying matching rules may include parsing carrier provided transit data for specific codes or descriptive words (e.g., "arrived"). If the status pattern or status description pattern matches the condition according to the matching rule, then the normalized shipment status and exception flag, if appropriate, are set for the shipment, thus generating normalized shipping information.

The enrich 260 or enhance step can be used to enrich or enhance data according to enrich rules 262. In some examples, properties can be implied based on the data. For example, package tracking data typically includes a timestamp. The timestamp may or may not be universal, so viewing the timestamp, without knowing the context, may present a problem. In the context of tracking data, for example, the shipping management system can see from the data the time zone in which a status event occurred. The timestamp can then be enhanced to include the actual time zone, or the enrich step can convert the timestamp to a local or universal time, as desired. This can help prevent tracking data from being listed out of order, due to differing time zones.

In another example of data enrichment, if the origin or destination location (e.g., postal code) is missing, but that information is available on either the first tracking event (e.g., pickup) or the last tracking event (e.g., delivery), for example, then the shipment record location information can be inferred.

In another example of data enrichment, if a shipment has been executed on the shipping management system platform, when the shipping management system collects the original shipment weight and cost, those values can be stored onto the shipment record as original weight and original cost. As the same shipment is being ingested and processed into the shipping management system, the system will detect changes of weight and cost compared to the original shipment record then the system can persist those as actual weight and cost and can notify users of changes (or create alerts).

In another example of data enrichment, when ingesting a large number of shipments, which could be assigned to the wrong carrier in the data feed, the system can run a number of rules over the provided tracking number to verify whether its format or pattern is compatible with the provided carrier. If it is not, the system can attempt to correct the carrier by gathering carriers which match the format or pattern of the provided tracking number, and use rules to pick a winner if it can be safely done (e.g., only a single carrier is returned as a candidate).

Once the extracted data is transformed, ingestion engine 200 determines if the transformed data corresponds to an existing shipping record. To determine if the data refers to a new or existing shipping record, the shipping management system can look to fields such as a carrier SCAC (a 4 letter code), a carrier's unique tacking number, or other fields, for example. The shipping management system may also determine if an event for a shipment is duplicative of an event in an event record. For example, shipping management system can compare the normalized event code, time stamp and other fields to event records for a shipment to determine if the event record is duplicative.

The new transformed data is then loaded (step 270) into the data store 280, which may be one example of data store 122. If the data does not correspond to an existing shipping record, ingestion engine 200 creates a new shipping record for the data. If the data corresponds to an existing shipping record and is not duplicative, the shipping management system appends or updates an existing shipping record with the new data. Updating a shipping record may include updating the event records associated with the shipping record. When updating an existing record with a new event, the shipping management system can determine if the new event is out of order by comparing the new event's timestamp to the timestamp of the timestamp of the latest event record associated with the shipment. If the time stamp of the new event is later than the timestamp of the latest event record, shipping management system can add an event record (e.g., Table 6) and update the status in the shipping record (e.g., Table 5) with the new status and, in some cases, exception. If, however, the time stamp of a new event for a shipment is prior to the timestamp of the latest event record for a shipment, the shipping management system may add an event record for the shipment without updating the status of the shipping record.

As discussed above, a carrier may provide data through multiple sources, such as through an API and shipment report files. In some cases, the API and shipment report files may provide different events for the same shipment. By ingesting shipment information from multiple sources, the shipping management system can provide a unified view that provides a more complete and accurate view of a shipment than would be provided by either source alone. Moreover, by ingesting data from multiple carriers for a shipper (or other account holder), the shipping management system can provide a unified view of shipments across carriers.

FIG. 2 also shows a user interface (UI) 285. In one example, the UI 285 is a web-based user interface comprising one or more web pages. As shipment data is extracted, transformed, and stored, a search index 290 is updated to reflect the new or updated data. In some embodiments, the search index 290 is updated in real-time, or close to read-time, as new events, shipments, etc. are entered into the system. The search index 290 enables a user, via the UI 285 to search the data store 280, as desired. In some embodiments, a separate report data store 295 is used to store data that is appropriate for reporting.

According to one embodiment, the shipping management system may receive a request from a client computer (e.g., a shipper computer system 110) for an interface containing data associated with a user account and substantially simultaneously initiate generation of a responsive interface 285. In particular, the shipping management system uses index 290 to determine a first set of results that represent the shipping records associated with the account and provides a responsive web page to display results from the first set of results. The web page may include normalized tracking data. Because the tracking data returned is, in some embodiments, determined prior to receiving the request and stored in a normalized format across carriers, the shipping management system can quickly retrieve the tracking data for shipments related to an account and generate an interface that presents a unified view containing tracking data for shipments determined from multiple data sources and from multiple carriers. Thus, the shipping management system can respond to a request for an interface in the times expected by users of the Internet and without a web browser timing out.

UI 285 provides controls to allow a user to filter the results. In addition, or in the alternative, UI 285 can allow a to request shipment data for a specific shipment. Responsive to a shipment-specific request, shipping management system can access the event records for the shipment and update UI 285 with additional data specific to the shipment. UI 285 may also include one or more web pages that display performance indicators to allow a user to directly compare carriers.

FIG. 3 is a diagrammatic representation of one embodiment of an operator interface comprising a web page 300 displaying a unified view of shipments across carriers. Web page 300 may be generated for a user associated with an account holder (e.g., a user at "Shipper X").

In the embodiment of FIG. 3, information from shipping records and/or other data structures is presented for individual shipments. The interface can include UI elements 302 to allow the user to filter the records based on attributes of the shipments contained in the shipping records or associated records, such as, for example status, mode, created date or other attributes. In the example of FIG. 3, the user has selected to view the shipments that have a normalized status of "IN_TRANSIT". The user may also select to view all shipments (e.g., all shipments associated with the account holder); shipments for the account holder that are associated with the normalized statuses of "SCHEDULED", "IN_TRANSIT", "APPOINTMENT", "OUT_FOR_DELIVERY", "DELIVERED", "CANCELED"; shipments for the account holder that are associated with normalized exception types; shipments for the account holder associated with predicted exception types; or other set of shipments as configured.

A wide variety of information can be displayed for each shipment. In the illustrated embodiment, for example, the information displayed for each shipment includes the tracking number, the bill of lading (BOL) number, the purchase order number (PO), origin, status, exception type and estimated delivery date. The user can select a particular shipment by clicking on the shipment to drill down into the details of the shipment.

FIG. 4 is a diagrammatic representation of a web page 400 displaying shipment specific information. Web page 400 includes a number of UI elements, such as widgets, to display or receive various information about the shipment. Web page portion 402 is configured to obtain and present the origin and recipient information, including recipient contact information associated with the shipment. Web page portion 404 is configured to display any notifications/alerts associated with a shipment. The alerts may be system generated alerts (e.g., exception notifications that were automatically sent based on an exception) and user generated alerts. By clicking on tool 406, the user can be provided with an interface that allows the user to compose and send a notification to the recipient. The shipping management system can store the user-generated alert in association with the shipment.

Web page portion 408 is configured to display subscription information. A subscription indicates an intended recipient or other party has subscribed for notifications related to the shipment. The subscription information can be specific to a communications channel to which the subscription corresponds. For example, web page portion 408 indicates a subscription for email notifications and includes an email to which to send the notifications. For an SMS notification subscription, on the other hand, the subscription information can include a mobile phone number.

Web page portion 410 is configured to display the current status for the shipment. Web page portion can display various visual indicators 412 (icons, colors, etc.) to indicate the status of the shipment (e.g., orange with triangle indicates a predicted exception, red with warning triangle indicates a carrier reported exception, red with calendar indicates that the shipment requires an appointment, green with a checkmark indicates that a shipment has been delivered. In the example of FIG. 4, the user selected to view information about a delivered shipment.

Web page portion 414 is configured to display the history of statuses associated with the shipment. That is, web page portion displays a representation of the series of event records for the shipment in time order. In some embodiments, web page portion 414 includes representation of exceptions in the time ordered series. Web page portion 416 is configured to display a summary of information associated with the shipment.

Web page may include other widgets or portions. For example, web page 400 may include portions to allow the user to start a customer support case related to the shipment, add notes to the shipment or provide other functionality related to a shipment.

Figure 5:
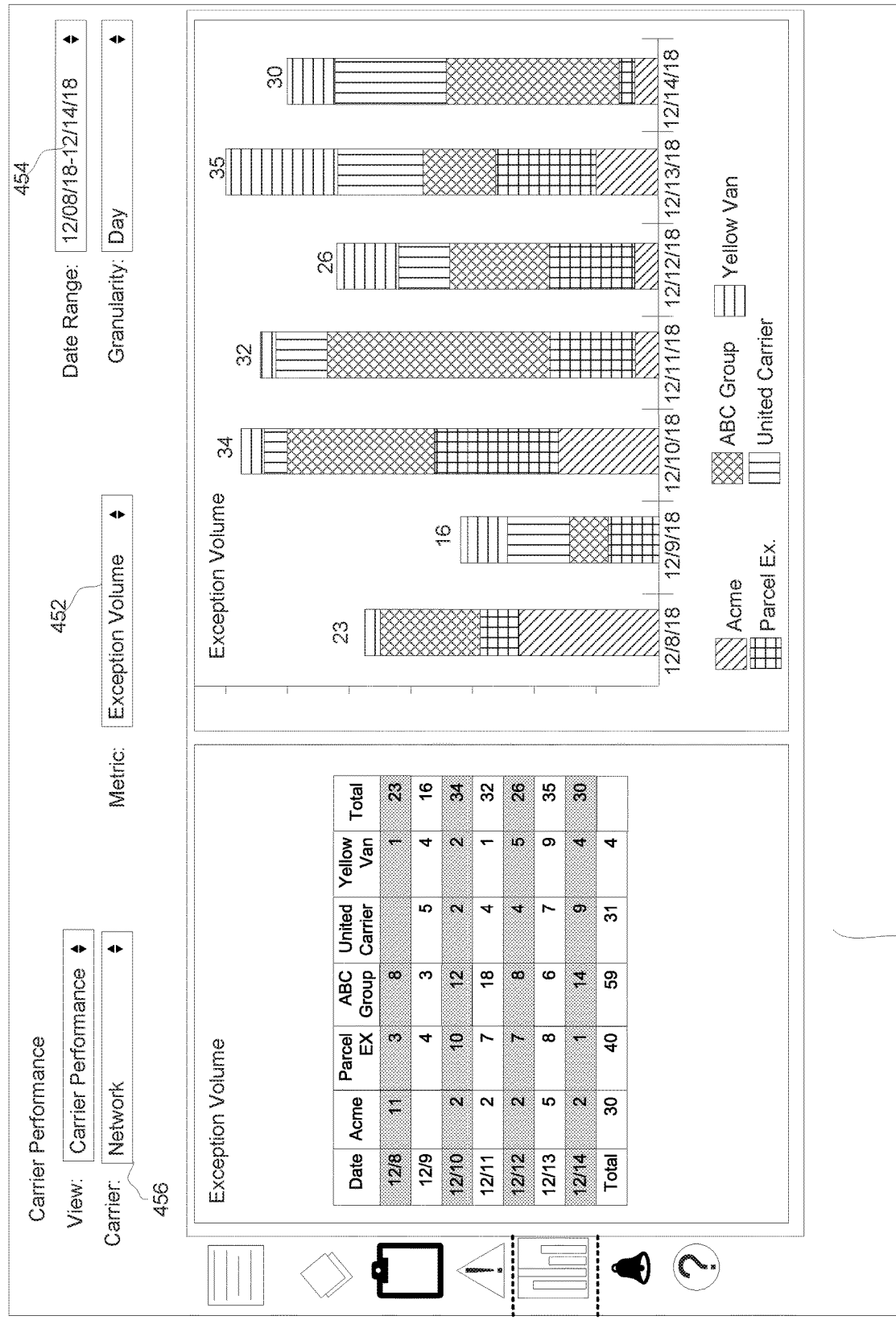
FIG. 5 is diagrammatic representation of one embodiment of an operator interface providing a comparison of carrier performance.

The shipping management system may also provide interface pages that represent performance across carriers. FIG. 5, for example, is diagrammatic representation of one embodiment of a carrier performance page 450. Carrier performance page 450 includes a UI element 452 and other UI elements to allow a user to select a performance indicator and other performance parameters for determining performance (e.g., date range UI element 454, carrier UI element 456). Example performance indicators include, but are not limited to, on-time delivery percentage, damage rates, exception volume, volume of returned shipments, volume of refused shipments and other performance indicators. Based on the selection of performance parameters, the browser can send a request to the shipping management system and the shipping management system can aggregate data from records associated with the respective account holder to determine the values for the selected metric.

In the illustrated embodiment, the user has selected "exception volume" as the metric, a date range and all carriers represented in the records for the date range. In this example, it is assumed that the shipping records associated with the account holder include records for shipments carried by five carriers during the selected time period. As such, the shipping management system returns the volume of exceptions for each of the five carriers in the selected date range using the selected granularity.

FIGS. 3-5 are provided by way of example and not limitation. A shipping management system may utilize any suitable interface and can provide a variety of pages. Other example interface pages include, but are not limited to, those described in U.S. patent application Ser. No. 15/836,374, filed Dec. 8, 2017, entitled "SHIPPING MANAGEMENT SYSTEM WITH MULTI-CARRIER SUPPORT" and U.S. patent application Ser. No. 15/836,354 filed Dec. 8, 2017, entitled "SYSTEMS AND METHODS FOR PREDICTIVE IN-TRANSIT SHIPMENT DELIVERY EXCEPTION NOTIFICATION AND AUTOMATED RESOLUTION."

Figure 6:
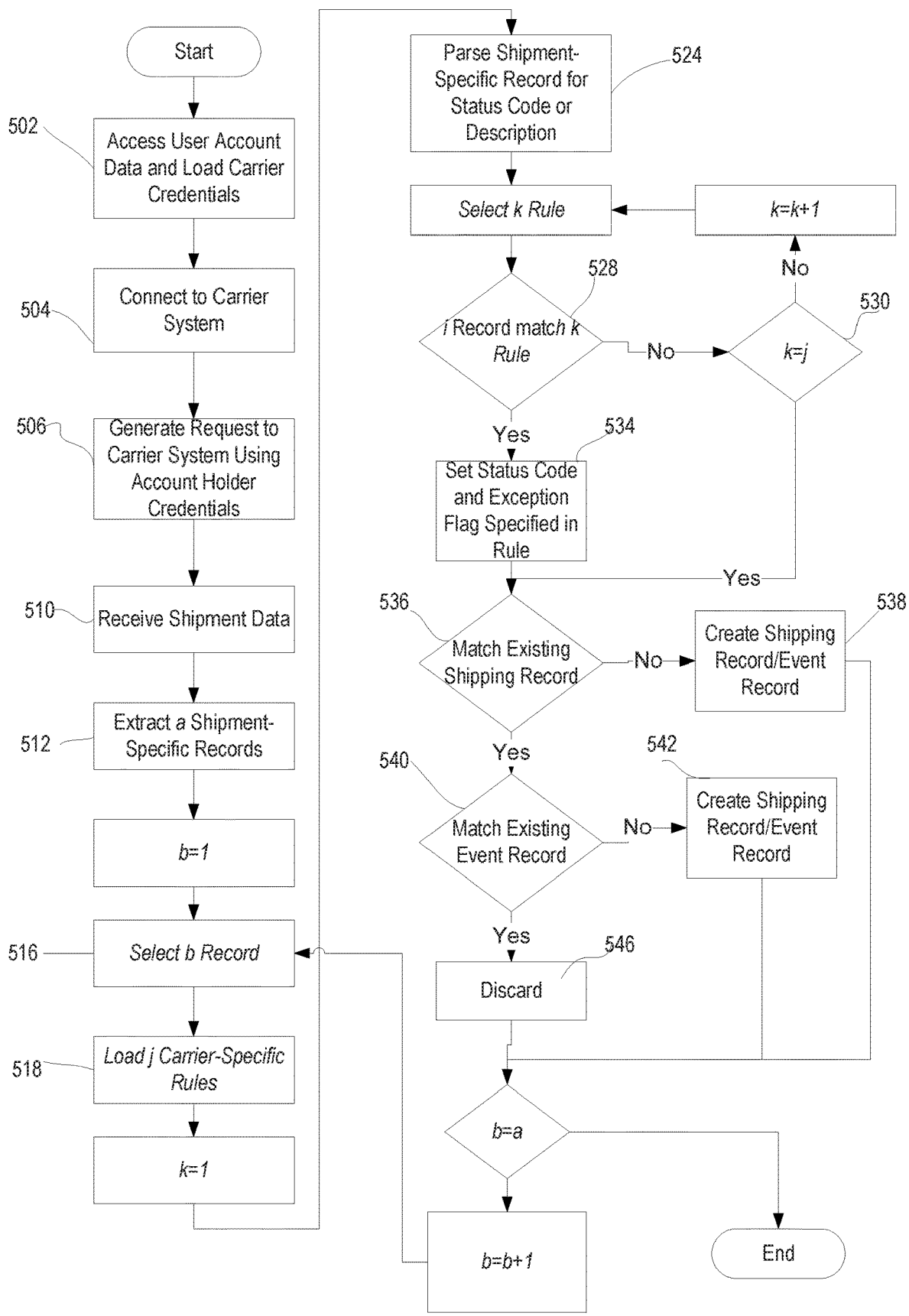
FIG. 6 is a flow chart of one embodiment of a method for processing carrier-specific shipment records.

FIG. 6 is a flow chart illustrating one embodiment of a method for processing shipment data. At step 502, a shipping management system can access user account data for an account holder (e.g., access a user profile for an account holder) and load that account holder's carrier credentials for a carrier. The shipping management system can connect to a carrier system and generate a request to the carrier system using the account holder's carrier credentials (step 504 and 506). For example, the shipping management system may provide the account holder's carrier credentials to the carrier system in conjunction with sending and API call or requesting a shipping report file from the carrier system. At step 510, the shipping management system receives shipping information corresponding to the provided carrier credentials, where the shipping information is formatted according to a known format used by the carrier. At step 512, extracts a shipment records. Each carrier-specific shipment record may uniquely identify a shipment by a unique identifier, such as a tracking number or other shipment number or some combination of information.

At step 516, the shipping management system selects a shipment record from the input data for processing. At step 518, the shipping management system loads j carrier-specific mapping rules for the carrier from which the shipment record was received. At step 524, the shipping management system parses the selected shipment record to determine a status code or description contained in the shipment record. At step 528, the shipping management system applies a selected carrier specific rule. If the selected shipment record matches the selected carrier-specific rule, control passes to step 534, where the shipping management system transforms the record by setting the status code and, in some cases, exception flag for the shipment record based on the selected rule, thus generating normalized shipping data. Otherwise, the shipping management system repeats step 528 for each of the carrier-specific rules until a match is found or the rules are exhausted.

At step 536, the shipping management system determines if the transformed shipment record matches a shipment for which a record already exists in shipping management system. If the transformed shipment record does not match a shipment, control passes to step 538. Shipping management system can create a new shipping record for the shipment and create an association between the shipping record and the account holder. The shipment represented by the shipment record may be assigned an internal id in shipping management system. If the transformed shipment record indicates an event (e.g., includes shipping status information), shipping management system can also create a shipping event record and associate the event record with the shipping record.

If the transformed shipment record does match an existing shipment in shipping management system, shipping management system can determine if the transformed shipment record contains a duplicative event for a pre-existing shipment in shipping management system (step 540). If not, the shipping management system creates a new event record and associates the new event record with the shipment (step 542). If the transformed shipment record is duplicative of an existing event record for a shipment, the transformed event record can be discarded (step 546). Steps 516-546 can be repeated for each shipment event record in a set of input data.

The steps of FIG. 6 may be repeated across multiple integration channels for multiple carriers to develop unified shipment data for an account holder. The steps of FIG. 6 are provided by way of example. The steps may be practiced in different orders, steps omitted, additional steps performed, or alternative steps practiced.

Figure 7:
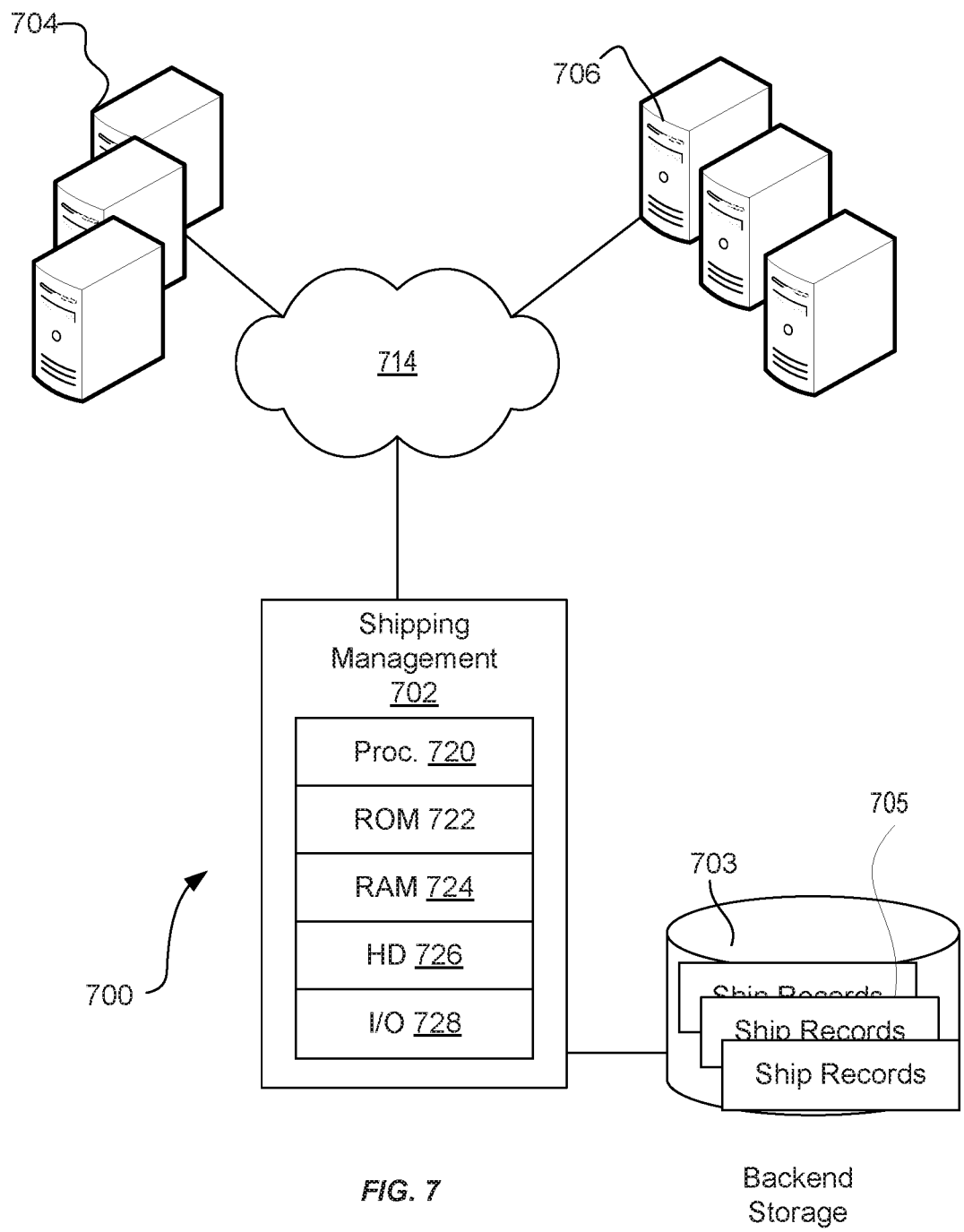
FIG. 7 is a diagrammatic representation of one embodiment of a distributed network environment.

FIG. 7 is diagrammatic representation of a distributed network computing environment 700 where embodiments disclosed can be implemented. In the example illustrated, network computing environment 700 includes network 714 that can be bi-directionally coupled to shipping management 702, a shipper computer systems 704, carrier computer systems 706, and other computer systems. Network 714 may represent a combination of wired and wireless networks that network computing environment 700 may utilize for various types of network communications known to those skilled in the art. Shipping management system 702 can be bi-directionally coupled to a data store 703 storing a searchable collection of normalized shipping records 705.

For the purpose of illustration, a single system is shown for shipping management system 702. However, shipping management system 702 may comprise a plurality of computers (not shown) interconnected to each other over network 714.

Shipping management system 702 can include a processor 720 (e.g., a CPU or other processor), read-only memory ("ROM") 722, random access memory ("RAM") 724, hard drive ("HD") or storage memory 726, and input/output device(s) ("I/O") 728. The I/O devices can include a keyboard, monitor, printer, electronic pointing device (such as a mouse, trackball, stylus, etc.), or the like. In various embodiments, the computer has access to at least one database over the network. Shipper computer systems 704 and a carrier computer systems 706 may each also include processors, memories, I/O and other computer components. Each search system 702, shipper computer system 704 and carrier computer system 706 of FIG. 7 may have more than one processor, ROM, RAM, HD, I/O, or other hardware components. For the sake of brevity, shipping management computer system 702 is illustrated as having one of each of the hardware components, even if more than one is used.

Portions of the methods described herein may be implemented in suitable software code that may reside within ROM; RAM; HD or other computer-readable memory. Shipping management system 702, for example, may include software components to implement a shipping management application 130. Shipping management system 702, for example, may include software components to implement data ingestion engine 200.

Embodiments may thus provide a unified view operator interface for shipping management data from multiple sources. The systems, methods, and products include one or more dashboards (for example, a web-based dashboard generated by an interface module) accessible by a user that is associated with an account holder. From the dashboard, the user can view various metrics and access functions of a shipping system, such as scheduling shipments. In some embodiments, a user can click on exceptions and/or tracking menu items to see information for all shipments associated with the account holder or information for all shipments that have exceptions or tracking information. Numerous other embodiments are also possible.

As described above, carriers have different ways to describe shipping status (e.g., tracking) information and shipment problem (e.g., exception) information. The system described provides a model for shipping status and shipping exceptions that considers many modes (parcel, LTL, white glove, etc.) and scenarios across the shipping landscapes. The system described also provides mechanisms to collect data from carriers "as is" and bring that into the system. The system includes mechanisms to map and transform the "as is" carrier data into a normalized model. The system provides a user interface to view and search data in the model to get shipment status, to gain insight, and to take action on problematic shipments.

There are many advantages to a normalized representation of shipping data that are enabled by the system described in this disclosure. For example, with a normalized representation, the user and system can notify a recipient that their shipment is in a particular status, or has recently changed status, across different carriers. Moreover, the system simplies integration with BPM solutions as a single BPM rule may be applied across multiple carriers. Thus, embodiments described herein facilitate integration with a variety of software rules-based processes, such as BPM processes, to trigger processes when a shipment achieves a particular status or milestone. For example, the system can trigger processes to send messages (text, email, etc.) to recipients when shipments are delivered, pay a carrier for a shipment when the shipment is delivered, or to electronically file a claim when a shipment is damaged.

Embodiments can also compare key performance indicators across carriers. For example, the system can determine and report information relating to the on-time delivery percentage of Carrier A vs. Carrier B. In another example, the system can compare the damage rates between Carrier A and Carrier B. In yet another example, the system can compare exception volumes. The system can also enable a user to easily compare the expected delivery date (typically provided by a carrier) and a retailer's promised delivery date (typically provided by a shipper or retailer) with the actual delivery data. The system can enable user to analyze other metrics in a similar manner. For example, the system enables user to easily compare the performance of different carriers with respect to damaged shipments, returned shipments, refused shipments, late deliveries, etc. The system also enables user to analyze shipments relating to special circumstances, such as returned shipments, shipments identified by customers as gifts, etc. Numerous other advantages and examples are also possible with the system.

Another advantage of the shipping management system described above relates to sending notifications to users. Since the shipment data from multiple carriers is normalized, the system can easily send notifications to user regarding shipping events/shipping statuses of all of their shipments, even with multiple carriers involved. Without the system described above, a system would have to manage and send notifications to users separately for each carrier.

Those skilled in the relevant art will appreciate that the invention can be implemented or practiced with other computer system configurations including, without limitation, multi-processor systems, network devices, mini-computers, mainframe computers, data processors, and the like. Embodiments can be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

Embodiments discussed herein can be implemented in a computer communicatively coupled to a network (for example, the Internet), another computer, or in a standalone computer. As is known to those skilled in the art, a suitable computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, touch pad, etc.), or the like. Embodiments discussed herein can be implemented in a set of distributed computers communicatively coupled to a network (for example, the Internet).

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including R, Python, C, C++, Java, JavaScript, HTML, or any other programming or scripting code, etc. Other software/hardware/network architectures may be used. Communications between computers implementing embodiments can be accomplished using any electronic, optical, radio frequency signals, or other suitable methods and tools of communication in compliance with known network protocols.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices.

A "processor" includes any, hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

It will be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Although the invention has been described with respect to specific embodiments thereof, these embodiments are merely illustrative, and not restrictive of the invention. Rather, the description is intended to describe illustrative embodiments, features and functions in order to provide a person of ordinary skill in the art context to understand the invention without limiting the invention to any particularly described embodiment, feature or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the meaning of "in" includes "in" and "on" unless the context clearly dictates otherwise.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed:

1. A shipping management system interfacing with a plurality of carrier systems associated with a plurality of carriers, comprising:
   a memory storing a set of computer executable instructions; and
   a processor coupled to the memory and configured to execute the set of computer executable instructions to cause the processor to:
      access, from each carrier system of the plurality of carrier systems, a set of carrier-specific shipment records associated with a set of shipments of a carrier corresponding to that carrier system,
      for each carrier-specific shipment record of the set of carrier-specific shipment records:
         parse the carrier-specific shipment record to determine a status code or exception type in the carrier-specific shipment record, wherein the carrier-specific shipment record comprises a tracking event,
         enrich the carrier-specific shipment record with shipment record location information that is inferred from the tracking event,
         based on (i) the status code or exception type and (ii) the carrier-specific shipment record that was enriched, generate normalized shipping information for the carrier-specific shipment record by setting the status code or exception type in the carrier-specific shipment record to a normalized status code or exception type, and
         store the normalized shipping information in association with a user account,
      receive a request for shipments associated with the user account, and
      generate a unified view interface to present a unified view of shipments associated with the user account, the unified view indicating the normalized status codes or exception types for the set of shipments across the plurality of carriers and enabling a user to request additional data associated with the set of shipments.

2. The shipping management system of claim 1, wherein the processor accesses the set of carrier-specific shipment records from a particular carrier via a plurality of integration paths.

3. The shipping management system of claim 1, wherein the processor is configured to execute the set of computer executable instructions to further cause the processor to:

determine if each carrier-specific shipping record represents an existing shipment at the shipping management system, and based on a determination that a given carrier specific shipping record does not correspond to an existing shipment, create a new shipping record.

4. The shipping management system of claim 1, wherein the processor is configured to execute the set of computer executable instructions to further cause the processor to:

modify a timestamp of the carrier-specific shipment record.

5. The shipping management system of claim 1, wherein the processor is configured to execute the set of computer executable instructions to further cause the processor to:

detect a change in weight and cost for the shipment associated with the carrier-specific shipment record, and update the carrier-specific shipment record to reflect the change in weight and cost.

6. The shipping management system of claim 1, wherein the processor is configured to execute the set of computer executable instructions to further cause the processor to:

apply a rule to a tracking number of the carrier-specific shipment record to determine that a format or pattern of the tracking number is not compatible with the respective carrier, and correct the carrier for the carrier-specific shipment record based on the format or pattern of the tracking number.

7. A computer-implemented method of interfacing with a plurality of carrier systems associated with a plurality of carriers, the computer-implemented comprising:

accessing, by one or more processors from each carrier system of the plurality of carrier systems, a set of carrier-specific shipment records associated with a set of shipments of a carrier corresponding to that carrier system;

for each carrier-specific shipment record of the set of carrier-specific shipment records:

parsing, by the one or more processors, the carrier-specific shipment record to determine a status code or exception type in the carrier-specific shipment record, wherein the carrier-specific shipment record comprises a tracking event, enriching, by the one or more processors, the carrier-specific shipment record with shipment record location information that is inferred from the tracking event, based on (i) the status code or exception type and (ii) the carrier-specific shipment record that was enriched, generating, by the one or more processors, normalized shipping information for the carrier-specific shipment record by setting the status code or exception type in the carrier-specific shipment record to a normalized status code or exception type, and storing the normalized shipping information in association with a user account;

receiving a request for shipments associated with the user account; and generating, by the one or more processors, a unified view interface to present a unified view of shipments associated with the user account, the unified view indicating the normalized status codes or exception types for the set of shipments across the plurality of carriers and enabling a user to request additional data associated with the set of shipments.

8. The computer-implemented method of claim 7, wherein accessing the set of carrier-specific shipment records comprises:

accessing, by the one or more processors from each carrier system of the plurality of carrier systems via an integration path associated with that carrier system, the set of carrier-specific shipment records.

9. The computer-implemented method of claim 7, further comprising:

determining, by the one or more processors, if each carrier-specific shipping record represents an existing shipment at the shipping management system; and based on a determination that a given carrier specific shipping record does not correspond to an existing shipment, creating a new shipping record.

10. The computer-implemented method of claim 7, further comprising:

modifying, by the one or more processors, a timestamp of the carrier-specific shipment record.

11. The computer-implemented method of claim 7, further comprising:

detecting, by the one or more processors, a change in weight and cost for the shipment associated with the carrier-specific shipment record, and updating, by the one or more processors, the carrier-specific shipment record to reflect the change in weight and cost.

12. The computer-implemented method of claim 7, further comprising:

applying, by the one or more processors, a rule to a tracking number of the carrier-specific shipment record to determine that a format or pattern of the tracking number is not compatible with the respective carrier, and correcting, by the one or more processors, the carrier for the carrier-specific shipment record based on the format or pattern of the tracking number.

13. A computer program product comprising a non-transitory computer readable medium storing a set of computer instructions executable by a processor to:

access, from each carrier system of a plurality of carrier systems, a set of carrier-specific shipment records associated with a set of shipments of a carrier corresponding to that carrier system;

for each carrier-specific shipment record of the set of carrier-specific shipment records:

parse the carrier-specific shipment record to determine a status code or exception type in the carrier-specific shipment record, wherein the carrier-specific shipment record comprises a tracking event, enrich the carrier-specific shipment record with shipment record location information that is inferred from the tracking event, based on (i) the status code or exception type and (ii) the carrier-specific shipment record that was enriched, generate normalized shipping information for the carrier-specific shipment record by setting the status code or exception type in the carrier-specific shipment record to a normalized status code or exception type, and store the normalized shipping information in association with a user account;

receive a request for shipments associated with the user account; and generate a unified view interface to present a unified view of shipments associated with the user account, the unified view indicating the normalized status codes or exception types for the set of shipments across the plurality of carriers and enabling a user to request additional data associated with the set of shipments.

14. The computer program product of claim 13, wherein the set of computer instructions are executable by the processor further to:
   determine if each carrier-specific shipping record represents an existing shipment at the shipping management system; and
   based on a determination that a given carrier specific shipping record does not correspond to an existing shipment, create a new shipping record.

15. The computer program product of claim 13, wherein the set of computer instructions are executable by the processor further to:
   modify a timestamp of the carrier-specific shipment record.

16. The computer program product of claim 13, wherein the set of computer instructions are executable by the processor further to:
   detect a change in weight and cost for the shipment associated with the carrier-specific shipment record, and
   update the carrier-specific shipment record to reflect the change in weight and cost.

17. The computer program product of claim 13, wherein the set of computer instructions are executable by the processor further to:
   apply a rule to a tracking number of the carrier-specific shipment record to determine that a format or pattern of the tracking number is not compatible with the respective carrier, and
   correct the carrier for the carrier-specific shipment record based on the format or pattern of the tracking number.

* * * * *

UNITED STATES PATENT AND TRADEMARK OFFICE
CERTIFICATE OF CORRECTION

PATENT NO. : 11,900,311 B2
APPLICATION NO. : 17/895824
DATED : February 13, 2024
INVENTOR(S) : Jennifer Lynn Bebout et al.

It is certified that error appears in the above-identified patent and that said Letters Patent is hereby corrected as shown below:

In the Claims

At Column 27, Line 33, "comprising:" should be -- method comprising: --.

Signed and Sealed this
Twenty-ninth Day of October, 2024

Katherine Kelly Vidal
*Director of the United States Patent and Trademark Office*